United States Patent
Golovchenko et al.

(10) Patent No.: US 7,688,080 B2
(45) Date of Patent: Mar. 30, 2010

(54) VARIABLY DIMENSIONED CAPACITANCE SENSOR ELEMENTS

(75) Inventors: Mykola Golovchenko, San Jose, CA (US); Bob Lee Mackey, San Jose, CA (US)

(73) Assignee: Synaptics Incorporated, Santa Clara, CA (US)

( * ) Notice: Subject to any disclaimer, the term of this patent is extended or adjusted under 35 U.S.C. 154(b) by 586 days.

(21) Appl. No.: 11/488,248

(22) Filed: Jul. 17, 2006

(65) Prior Publication Data

US 2009/0021267 A1    Jan. 22, 2009

(51) Int. Cl.
*G01R 27/26* (2006.01)
*G06F 3/041* (2006.01)

(52) U.S. Cl. .................. 324/660; 324/686; 345/173
(58) Field of Classification Search .............. 324/660, 324/686
See application file for complete search history.

(56) References Cited

U.S. PATENT DOCUMENTS

| | | | | | |
|---|---|---|---|---|---|
| 4,780,662 | A | * | 10/1988 | Bennett et al. | 324/662 |
| 5,796,183 | A | * | 8/1998 | Hourmand | 307/116 |
| 5,886,687 | A | * | 3/1999 | Gibson | 345/173 |
| 5,942,733 | A | * | 8/1999 | Allen et al. | 178/18.01 |
| 6,879,930 | B2 | * | 4/2005 | Sinclair et al. | 702/150 |
| 7,382,139 | B2 | * | 6/2008 | Mackey | 324/660 |
| 2006/0038791 | A1 | * | 2/2006 | Mackey | 345/173 |
| 2007/0074914 | A1 | * | 4/2007 | Geaghan et al. | 178/18.06 |

* cited by examiner

*Primary Examiner*—Jeff Natalini

(57) ABSTRACT

A capacitance sensing apparatus includes capacitance sensor elements covered by a layer of material. The layer of material has an uneven effect on a measure of capacitance induced in the capacitance sensor elements when an object is in proximity to a sensing surface. For example, the layer of material may have a non-uniform thickness, or a property of the material may be non-uniform across the layer. The capacitance sensor elements are dimensioned to compensate for the effect.

30 Claims, 8 Drawing Sheets

CAPACITANCE SENSOR ELEMENTS

VARIABLY DIMENSIONED CAPACITANCE SENSOR ELEMENTS

BACKGROUND

Conventional computing devices enable a user to input a choice or a selection in different ways. For example, a user can use an alphanumeric keyboard, a cursor control device or a microphone to indicate a choice or selection. Moreover, touch sensing technology can be used to provide an input selection to a computing device or other types of electronic devices.

Within the broad category of touch sensing technology there exist capacitive sensing touch sensors, commonly referred to as capacitive touchpads or simply touchpads. Touchpads are typically implemented with a flat or planar input (sensing) region or surface; that is, the surface that a user places his or her finger on is typically flat. Other types of capacitive touchpads utilize non-planar sensing surfaces, shaped as a concave or convex bowl, for example. Capacitance sensor elements are distributed underneath the sensing surface and are separated from the sensing surface by intervening material. When the user's finger is placed on the sensing surface, a capacitance is induced in the sensor elements.

Non-planar touchpads can be problematic if the capacitance sensor elements are planar, because the thickness of material between the sensing surface and the sensor elements will be non-uniform. Hence, a capacitive coupling between an object (e.g., a user's finger) and the sensor elements will be non-uniform. If the capacitance sensor elements are made to conform to the shape of the sensing surface, the touchpad may be more costly to manufacture.

SUMMARY

Embodiments in accordance with the present invention pertain to capacitive sensing apparatuses that compensate for the effect of a non-planar sensing surface. In one embodiment, a capacitance sensing apparatus includes capacitance sensor elements covered by a layer of material. The layer of material has an uneven effect on a measure of capacitance induced in the capacitance sensor elements when an object is in proximity to a sensing surface. For example, the layer of material may have a non-uniform thickness, or a property of the material may be non-uniform across the layer. The capacitance sensor elements are dimensioned to compensate for the effect.

The drawings referred to in this description should not be understood as being drawn to scale except if specifically noted.

DETAILED DESCRIPTION

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
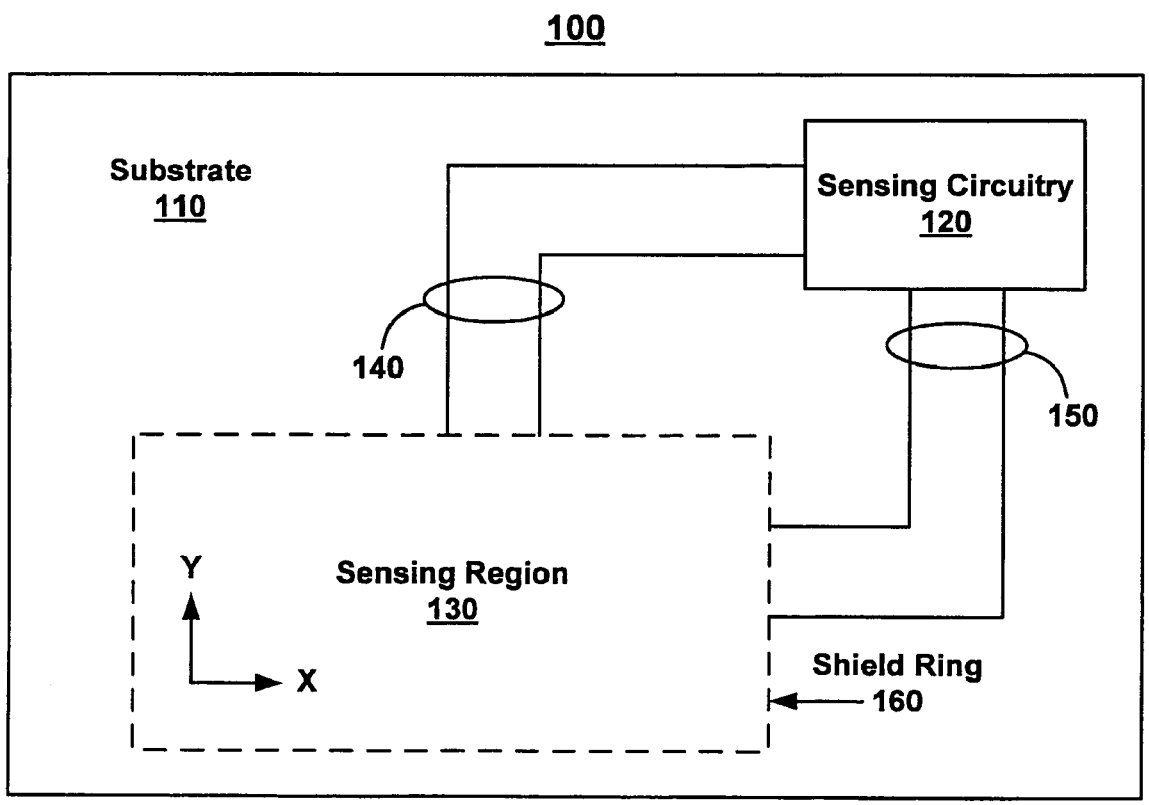
FIG. 1 is a block diagram of an example capacitive touch sensor device according to embodiments of the invention.

FIG. 1 is a plan view of an example two-dimensional capacitance sensing apparatus 100 that can be implemented using one or more embodiments of the present invention. The capacitance sensing apparatus 100 can be utilized to communicate user input (e.g., using a user's finger or a probe) to a computing device or other types of electronic devices.

Embodiments of sensing element patterns in accordance with the invention, examples of which are described in conjunction with FIGS. 3, 5, 6 and 7, can be implemented to form sensing region 130. Furthermore, the sensing region 130 of FIG. 1 is not necessarily limited to the use of a single sensor pattern. In other words, multiple sensors utilizing the same or different sensor patterns can be placed adjacent to each other within sensing region 130. Also, sensing region 130 is not limited to a rectilinear shape. For example, sensing region 130 may be curved or round in shape.

The capacitance sensing apparatus 100, when implemented as a touch sensor, can include a substrate 110 on which electrically conductive coupling traces 140 and 150 (also referred to herein as electrical conductors) are patterned or formed. Electrical conductors 140 and 150 can be utilized for coupling capacitance sensor elements or conductive traces that would form a sensing region 130 with sensing circuitry 120, thereby enabling the operation of capacitance sensing apparatus 100. Electrical conductors 140 and 150 may each include one or more conductive coupling elements or traces. A signal or signals carried by electrical conductors 140 can be used to identify a position in one dimension (e.g., in the x-direction), while a signal or signals carried by electrical conductors 150 can be used to identify that position in a second dimension (e.g., in the y-direction).

In one embodiment, a shield trace or shield ring 160 is located along the perimeter of the sensing region 130. The shield trace 160 may be electrically guarded, grounded, and/or held at a substantially fixed or constant potential. When guarded, the shield trace 160 functions to reduce the effect of a fringing electrical field on capacitance sensor elements, thereby reducing any mismatch between the various sensor elements.

Figure 2:
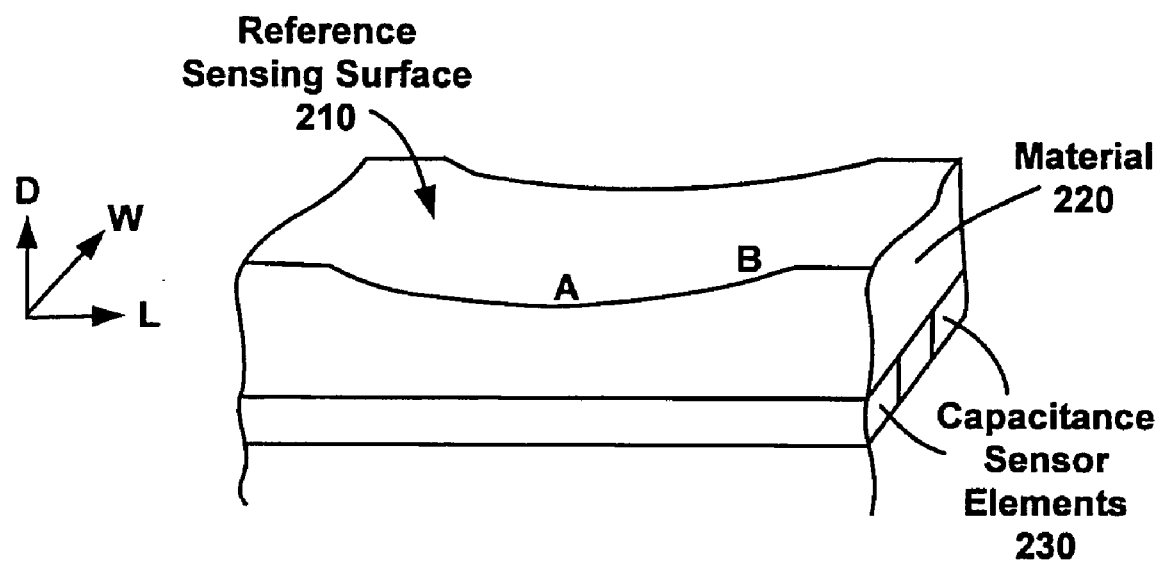
FIG. 2 is a cross-sectional view showing a portion of a capacitance sensing apparatus according to an embodiment of the present invention.

FIG. 2 is a cross-sectional view showing a portion of a capacitance sensing apparatus 200 according to an embodiment of the present invention. The portion of capacitive sensing apparatus 200 shown in FIG. 2 corresponds to a cross-section of sensing region 130 of FIG. 1.

In the example of FIG. 2, capacitance sensing apparatus 200 includes a reference sensing surface 210. Underlying the reference sensing surface 210 is an arrangement of a number of capacitance sensor elements 230, examples of which are described further in conjunction with FIGS. 3, 5, 6 and 7, below. The reference sensing surface 210 and the capacitance sensor elements 230 are separated by material 220. If an object such as a user's finger, a probe, stylus or the like is in proximity to (or in contact with) capacitance sensing apparatus 200, a capacitance (or current, voltage, etc.) above a background amount (which may be zero or negligible) is induced in the capacitance sensor elements 230—for simplicity of discussion, this may be referred to herein as "capacitive coupling."

Generally speaking, in the absence of a compensating effect, material 220 of FIG. 2 has some attribute or property that causes an uneven or non-uniform effect on the measure of capacitance induced in the capacitance sensor elements 230 by an object in proximity to reference sensing surface 210, depending on the position of that object on reference sensing surface 210. In other words, because capacitive coupling may be non-uniformly affected by some attribute or property of material 220 in the absence of a compensating effect, an object at a first position on reference sensing surface 210 could induce a different amount of capacitance than that induced by the object at a second position on reference sensing surface 210. As will be seen, in accordance with embodiments of the present invention, the capacitance sensor elements 230 are dimensioned to compensate for the uneven effect of material 220 on capacitive coupling.

In the example of FIG. 2, material 220 has non-uniform thickness D due to the non-planar shape of the reference sensing surface 210; that is, the thickness D of material 220 varies along the length L of capacitance sensing apparatus 200. The thickness D of material 220 may also vary in the width dimension W. If not compensated, the non-uniform thickness of material 220 would have an uneven effect on capacitive coupling.

In the example of FIG. 2, reference sensing surface 210 is concave and symmetrical (e.g., bowl-shaped). Viewed from above, reference sensing surface 210 may be circular in shape. However, the present invention is not so limited. For example, the sensing surface 210 may be convex, or other than symmetrical, bowl-shaped or circular.

Attributes of material 220 other than or in addition to its thickness can have an effect on the capacitance induced in capacitance sensor elements 230. For example, a property of material 220, such as but not limited to its hardness, permittivity, dielectric constant, and/or density, may be non-uniform in any of the dimensions L, W and D.

Material 220 may consist of a single layer of a single material or different types of materials (e.g., a composite), multiple layers of the same type of material, or multiple layers of different types of material. Material 220 may be, but is not limited to, a fluid, a gas, a polymer, a plastic and/or a foam. Thus, for example, variations in material properties (including material thickness) within a layer of material or variations in material properties from one layer to the next may, in the absence of a compensating effect, contribute to non-uniform capacitive coupling between an object at different positions on reference sensing surface 210 and capacitance sensor elements 230.

Figure 3:
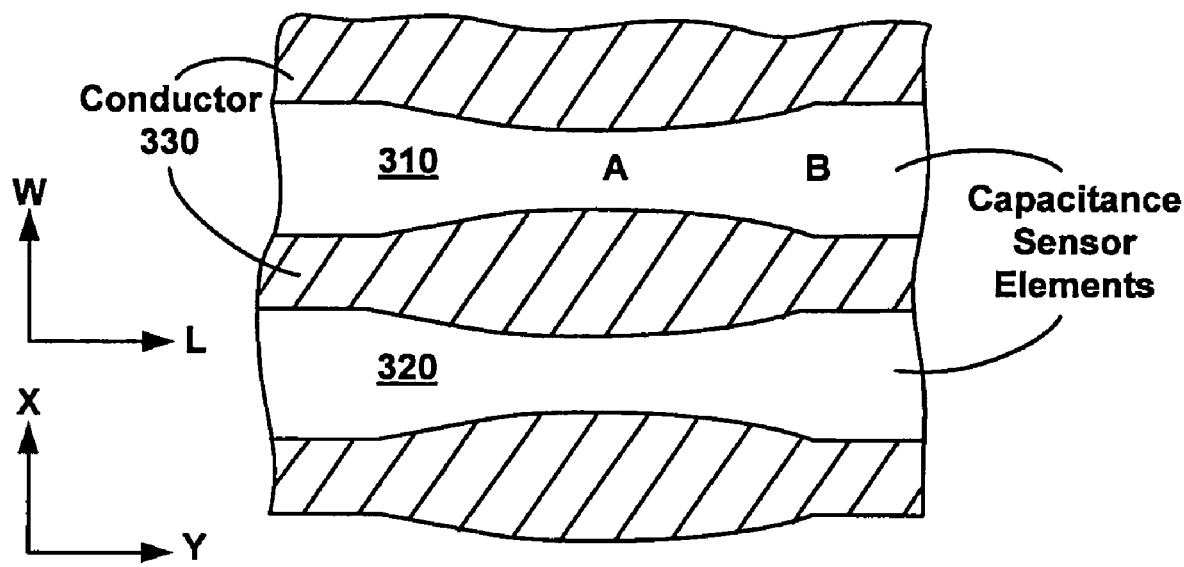
FIG. 3 illustrates capacitance sensor elements according to an embodiment of the present invention.

FIG. 3 illustrates capacitance sensor elements 310 and 320 according to an embodiment of the present invention. FIG. 3 is in essence a top-down view of the capacitance sensor elements 230 shown in cross-section in FIG. 2. Capacitance senor elements 310 and 320 are illustrated as running lengthwise L in the x-direction. There may be more than two such capacitance sensor elements, and there may also be other capacitance sensor elements orthogonal to capacitance sensor elements 310 and 320, running lengthwise in the y-direction.

In the example of FIG. 3, with reference also to FIG. 2, the capacitance sensor elements 310 and 320 are dimensioned to compensate for the uneven effect of material 220 on capacitive coupling. For example, at position A, where the thickness D of material 220 is at a minimum, the widths W of capacitance sensor elements 310 and 320 are also at a minimum. As the thickness of material 220 increases, the widths of capacitance sensor elements 310 and 320 also increase. Consequently, the capacitance induced in capacitance sensor element 310, for example, if an object (e.g., a user's finger, a probe or the like) is at position A on reference sensing surface 210, and the capacitance induced in capacitance sensor element 310 if the object is at position B on reference sensing surface 210, would be about the same. More generally, the increase in capacitance in the capacitance sensor elements is about the same no matter where the object is positioned within the sensing region.

The widths of the capacitance sensor elements 310 and 320 are not necessarily directly proportional to the thickness of material 220. In other words, if the thickness of material 220 increases at a certain rate, the widths of capacitance sensor elements 310 and 320 do not necessarily increase at that same rate. Also, although the examples of FIGS. 2 and 3 pertain to the thickness of material 220, as mentioned above other attributes or properties of material 220 can effect capacitive coupling.

Also, capacitance sensor element 310 may be the same size as capacitance sensor element 320—that is, they may have the same widths—or they may be of different sizes (e.g., widths). Consider, for example, an embodiment in which reference sensing surface 210 is concave in shape. As such, the thickness of material 220 would vary in every direction, but specifically in both the x-direction and the y-direction. The capacitance sensor elements underlying a reference sensing surface 210 shaped in this manner can be dimensioned differently from each other, depending on what region of the surface 210 they respectively lie under (in other words, depending on the local properties or attributes of the material 220). In general, it can be said that a dimension of capacitance sensor element 310 varies in correspondence with the variations in attributes or properties of the material 220 under which it lies, and the same can be said for capacitance sensor element 320, and as a result they may be dimensioned the same or differently.

In one embodiment, the effect of a fringing electrical field on capacitive coupling can be mitigated using a conductor 330 situated between capacitance sensor elements 310 and 320, as well as between other capacitance sensor elements, and connected to a shield trace (e.g., shield ring 160 of FIG. 1). However, in some instances, fringing effects may be helpful. If fringing to a ground plane (not shown) is much smaller than fringing to the object being sensed (e.g., a user's finger), then the adjusted pattern can mostly preserve the signal magnitude and result in a better-balanced background capacitance. Thus, in some instances, shielding may not be desirable, while in other instances, it may be desirable.

Figure 4:
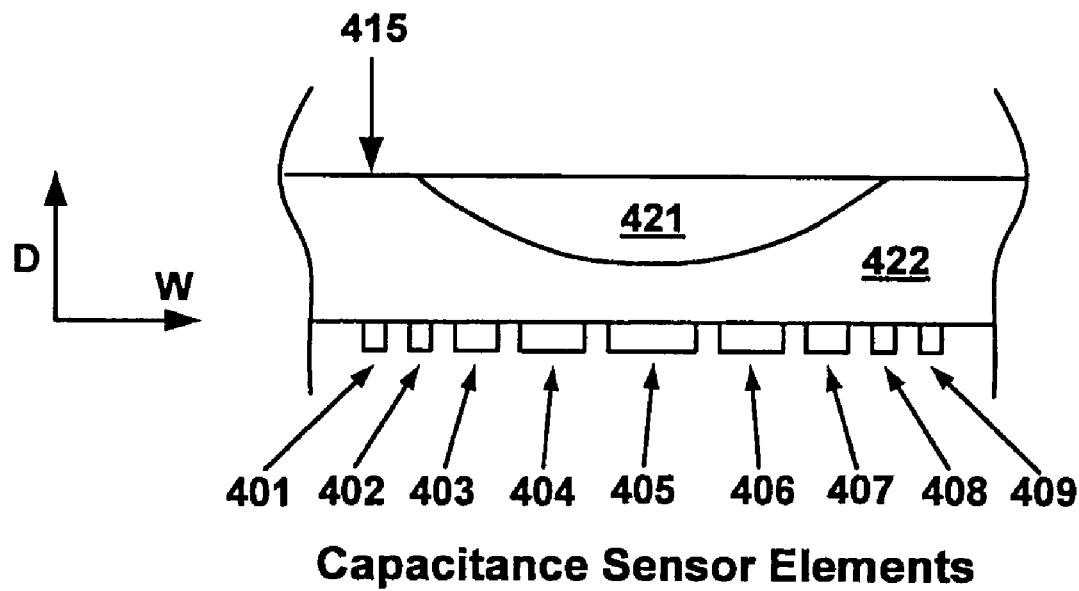
FIG. 4 is a cross-sectional view showing a portion of a capacitance sensing apparatus according to another embodiment of the present invention.

FIG. 4 is a cross-sectional view showing a portion of a capacitance sensing apparatus 400 according to another embodiment of the present invention. The portion of capacitive sensing apparatus 400 shown in FIG. 4 corresponds to a cross-section of sensing region 130 of FIG. 1.

In the example of FIG. 4, capacitance sensing apparatus 400 includes a reference sensing surface 415. Underlying the reference sensing surface 415 is an arrangement of a number of capacitance sensor elements 401, 402, 403, 404, 405, 406, 407, 408 and 409 (401-409). In the example of FIG. 4, the reference sensing surface 415 and the capacitance sensor elements 401-409 are separated by one or more materials 421 and 422.

In the example of FIG. 4, the thicknesses D of materials 421 and 422 vary in the width dimension W, and material 421 does not extend across the entire width of capacitance sensing apparatus 400. Thus, some capacitance sensor elements (e.g., capacitance sensor elements 401, 402, 408 and 409) may lie under only material 421 and other capacitance sensor elements (e.g., capacitance sensor elements 403-407) may lie under both material 421 and material 422. Of the capacitance sensor elements that lie under both material 421 and material 422, some lie under regions of capacitance sensor apparatus 400 that have more of material 421 (and correspondingly less of material 422) than other regions.

In general, in the absence of a compensating effect, the non-uniform distribution of materials 421 and 422 would contribute to non-uniform capacitive coupling between an object at different positions on reference sensing surface 415 and capacitance sensor elements 401-409. In the example of FIG. 4, the capacitance sensor elements 401-409 are dimensioned to compensate for the uneven effect of materials 421 and 422 on capacitive coupling. More specifically, in one embodiment, the capacitance sensor elements 401-409 have different widths W, depending on the relative composition of the material under which they lie. Thus, for example, the capacitance sensor element 405 is the widest in the region of capacitance sensing apparatus 400 where material 421 is thickest. As the thickness of material 421 decreases, the widths of the capacitance sensor elements also decrease. At locations where material 421 is not present, the capacitance sensor elements are the narrowest.

The discussion above presumes that material 421 has a detrimental effect on capacitive coupling (capacitive coupling is reduced as the thickness of material 421 increases). If instead material 421 has a beneficial effect on capacitive coupling, then as the thickness of material 421 increases, the widths of the capacitance sensor elements are reduced.

Reference sensing surface 415 may or may not be flat. If reference sensing surface 415 is uneven, then the capacitance sensor elements 401-409 can be dimensioned to account not only for the effects of materials 421 and 422, but also for the effects of the thickness of material between the capacitance sensor elements and the reference sensing surface, in a manner similar to that described above in conjunction with FIGS. 2 and 3.

Figure 5:
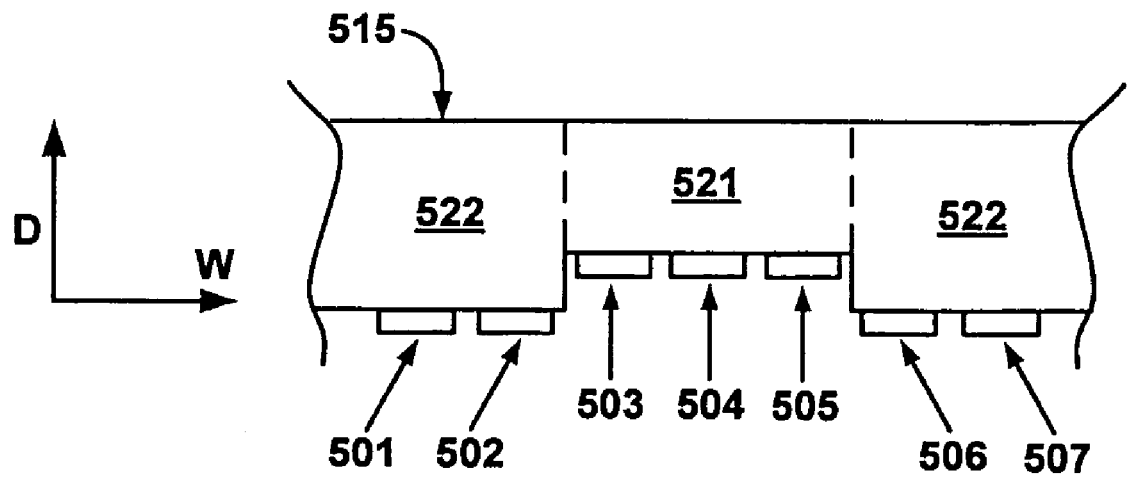
FIG. 5 is a cross-sectional view showing a portion of a capacitance sensing apparatus according to yet another embodiment of the present invention.

FIG. 5 is a cross-sectional view showing a portion of a capacitance sensing apparatus 500 according to yet another embodiment of the present invention. The portion of capacitive sensing apparatus 500 shown in FIG. 5 corresponds to a cross-section of sensing region 130 of FIG. 1.

In the example of FIG. 5, capacitance sensing apparatus 500 includes a reference sensing surface 515. Underlying the reference sensing surface 515 is an arrangement of a number of capacitance sensor elements 501, 502, 503, 504, 505, 506 and 507 (501-507). In the example of FIG. 5, the reference sensing surface 515 and the capacitance sensor elements 501-502 and 506-507 are separated by material 522, and the reference sensing surface 515 and the capacitance sensor elements 503-505 are separated by material 521.

In the example of FIG. 5, in the absence of a compensating effect, a property of the materials 521 and 522 (e.g., a material property other than the thickness, such as hardness, permittivity, dielectric constant, and/or density) may contribute to non-uniform capacitive coupling between an object at different positions on reference sensing surface 515 and capacitance sensor elements 501-507. In the example of FIG. 5, the depths D of capacitance sensor elements 501-507 are varied to compensate for the uneven effect of materials 521 and 522 on capacitive coupling. In the example of FIG. 5, in the region of capacitance sensing apparatus 500 composed of material 521, the corresponding capacitance sensor elements 503-505 are closer to reference sensing surface 515 then the capacitance sensor elements 501-502 and 506-507 that correspond to the regions composed of material 522.

The discussion above presumes that material 521 has a detrimental effect on capacitive coupling relative to the effect of material 522. If, relative to material 522, material 521 instead has a beneficial effect on capacitive coupling, then the corresponding capacitance sensor elements 503-505 may be further from reference sensing surface 515 than capacitance sensor elements 501-502 and 506-507.

Alternatively, instead of varying the depths of the capacitance sensor elements 501-507, the widths W of the capacitance sensor elements can be varied to compensate for the non-uniform effect of materials 521 and 522 on capacitive coupling, in a manner similar to that described above in conjunction with FIG. 4.

Reference sensing surface 515 of FIG. 5 may or may not be flat. If reference sensing surface 515 is uneven, then the capacitance sensor elements 501-507 can be dimensioned to account not only for the effects of materials 521 and 522, but also for the effects of the thickness of material between the capacitance sensor elements and the reference sensing surface, in a manner similar to that described above in conjunction with FIGS. 2 and 3.

Figure 6:
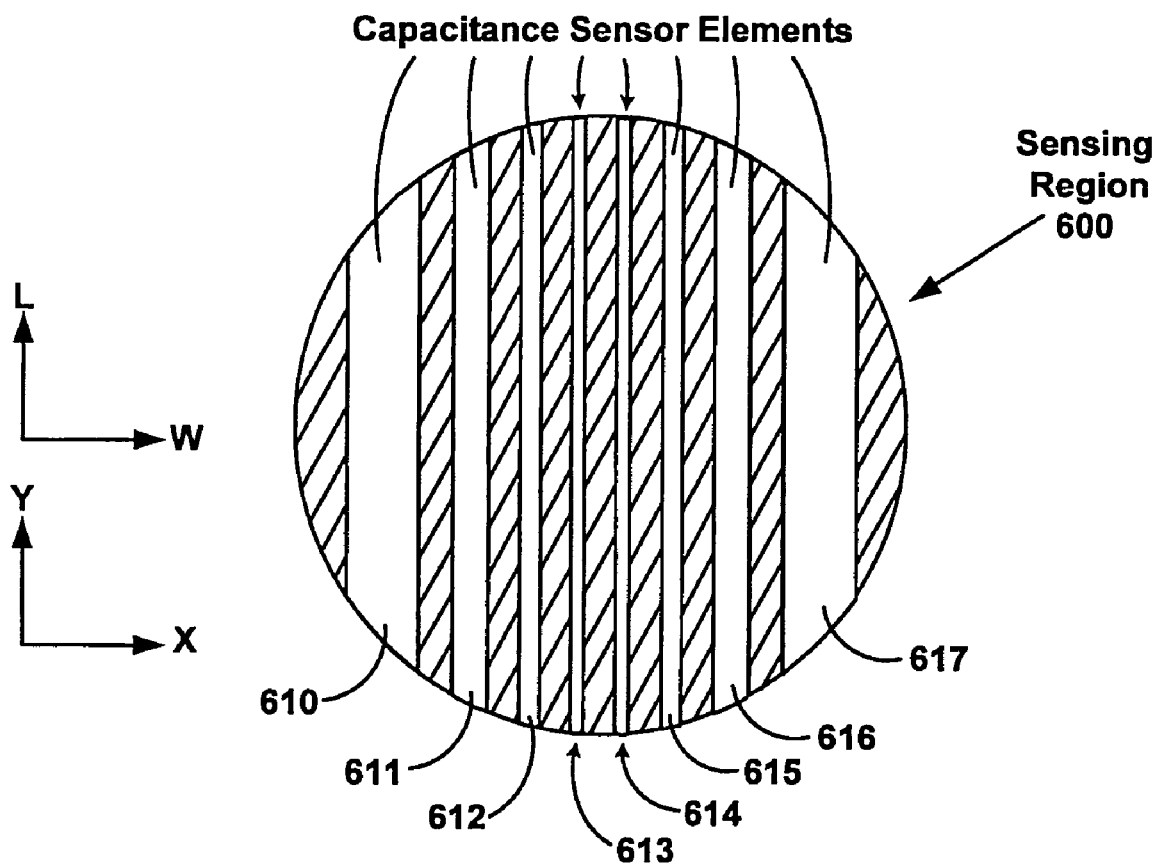
FIG. 6 illustrates capacitance sensor elements according to another embodiment of the present invention.

FIG. 6 is a top-down view of a circular capacitance sensing region 600 that overlays an arrangement of capacitance sensor elements 610, 611, 612, 613, 614, 615, 616 and 617 (610-617) according to another embodiment of the present invention. In this example, because of the shape of the sensing region 600, some capacitance sensor elements are shorter in length L than others. Capacitance sensing elements of different lengths can result from sensing region shapes that are other than circular or curved.

Capacitance sensor elements 610-617 are illustrated as running lengthwise in the y-direction. There may be more capacitance sensor elements than the number illustrated, and there may also be other capacitance sensor elements orthogonal to capacitance sensor elements 610-617, running lengthwise in the x-direction.

In the absence of a compensating effect, a background capacitance measured on a longer one of the capacitance sensor elements 610-617, if measured in the absence of an object, may be different from a background capacitance measured on a shorter one of the capacitance sensor elements 610-617, if measured in the absence of an object. However, in the example of FIG. 6, the capacitance sensor elements 610-617 are dimensioned to compensate for their different lengths, such that the background capacitances of the various capacitance sensor elements 610-617 are approximately the same.

More specifically, in one embodiment, the widths W of the various capacitance sensor elements 610-617 are different, depending on their respective length, in order to balance the background capacitances of the capacitance sensor elements 610-617. In general, within the context of the example of FIG. 6, shorter capacitance sensor elements are wider than longer capacitance sensor elements.

Figure 7:
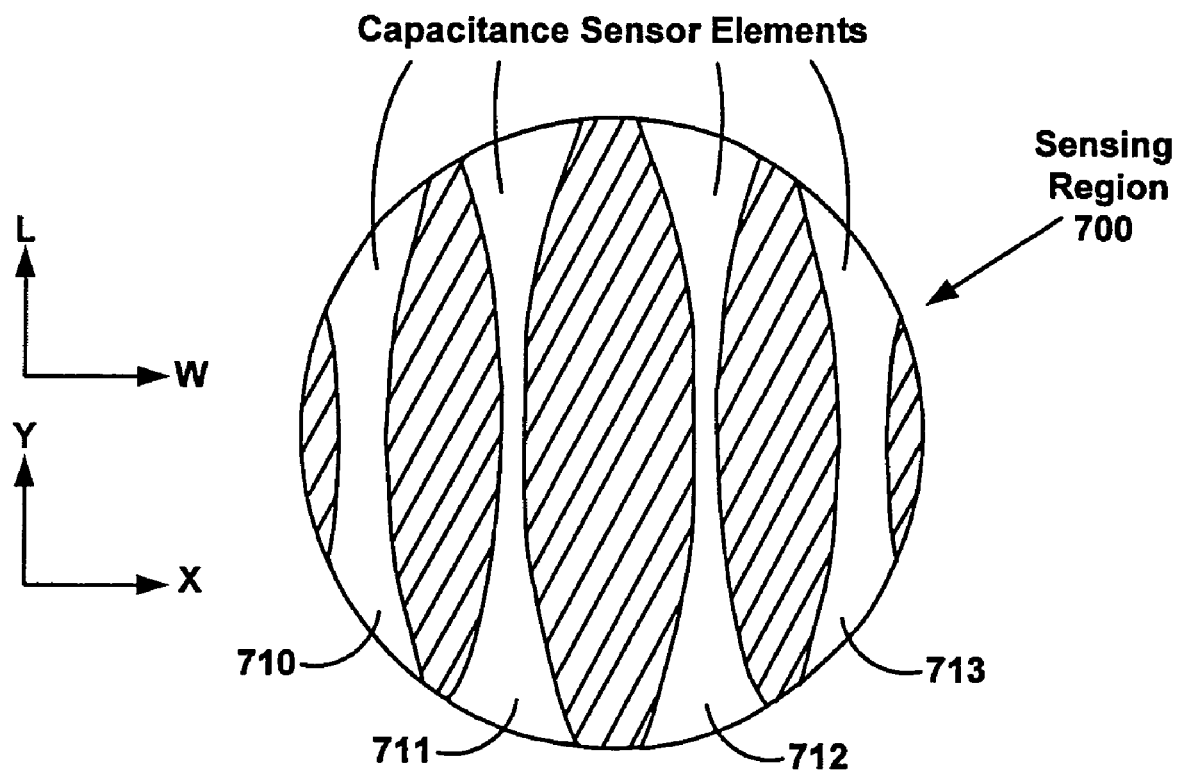
FIG. 7 illustrates capacitance sensor elements according to yet another embodiment of the present invention.

FIG. 7 is a top-down view of a circular capacitance sensing region 700 that overlays an arrangement of capacitance sensor elements 710, 711, 712 and 713 (710-713) according to another embodiment of the present invention. In this example, because of the shape of the sensing region 700, some capacitance sensor elements are shorter in length L than others. Capacitance sensing elements of different lengths can result from sensing region shapes that are other than circular or curved.

Capacitance sensor elements 710-713 are illustrated as running lengthwise in the y-direction. There may be more capacitance sensor elements than the number illustrated, and there may also be other capacitance sensor elements orthogonal to capacitance sensor elements 710-713, running lengthwise in the x-direction.

Also, in the example of FIG. 7, sensing region 700 is bowl-shaped (e.g., concave and symmetrical). As such, a cross-sectional view of sensing region 700 would be similar in shape to the shape illustrated by FIG. 2. Thus, in the example of FIG. 7, the material separating the sensing surface of sensing region 700 and the underlying capacitance sensor elements 710-713 would be thickest around the rim of sensing region 700, and the thickness of that material would decrease toward the center of sensing region 700.

In the example of FIG. 7, the capacitance sensor elements 710-713 are dimensioned to compensate for the otherwise uneven effect on capacitive coupling of both the different lengths of the capacitance sensor elements and the varying thickness of the overlying material.

More specifically, in one embodiment, the widths W of the various capacitance sensor elements 710-713 vary in the y-direction, depending on their respective length L, and the widths W of the various capacitance sensor elements 710-713 also vary in the x-direction, depending on the thickness of the material between the capacitance sensing elements and the reference sensing surface of sensing region 700.

Figure 8:
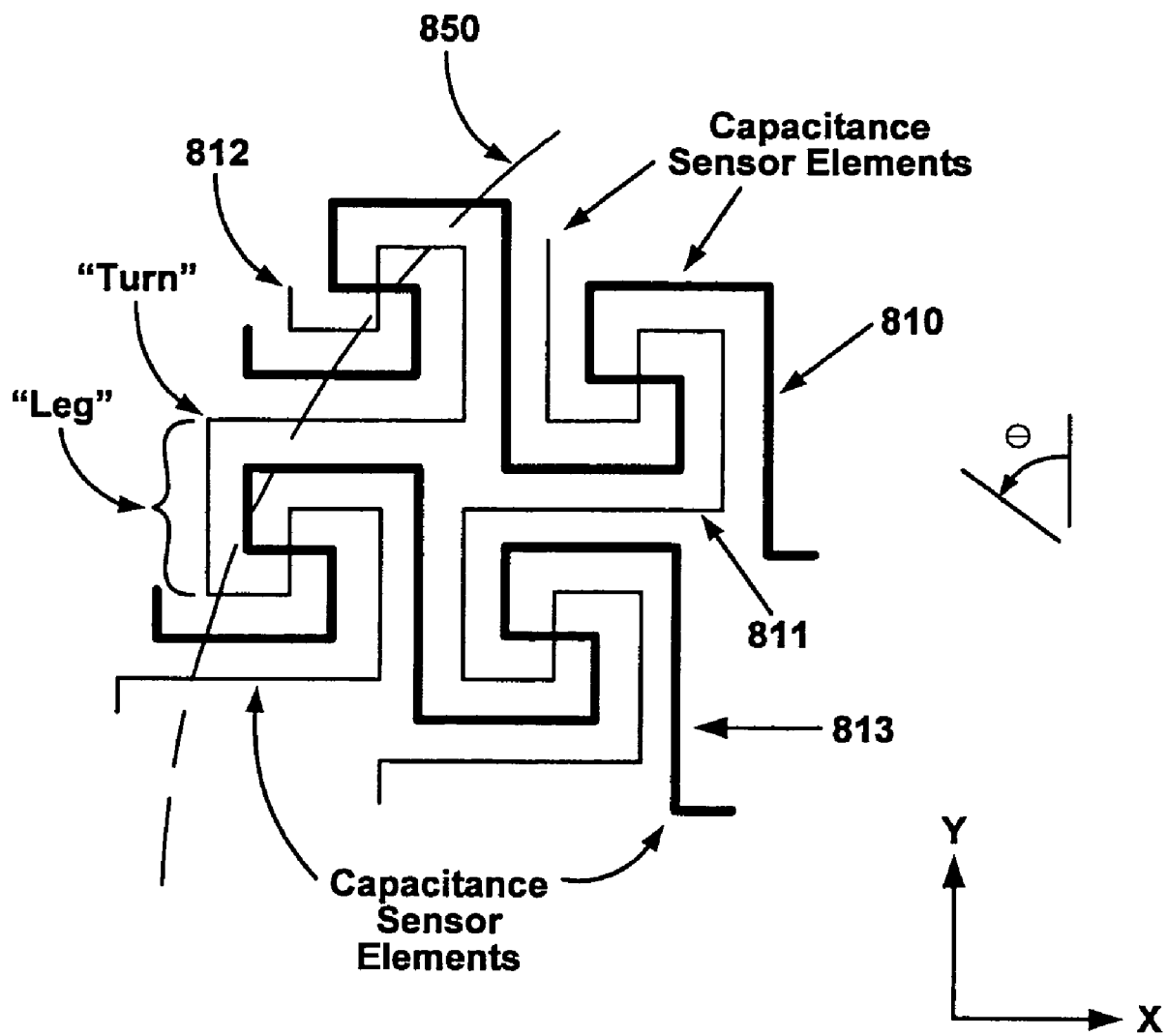
FIG. 8 illustrates capacitance sensor elements according to yet another embodiment of the present invention.

FIG. 8 illustrates an arrangement of capacitance sensor elements 810, 811, 812 and 813 (810-813) according to yet another embodiment of the present invention. The capacitance sensor elements 810-813 can each be characterized by several parameters, such as the lengths of their various "legs" (the linear segments between "turns"), the number of turns, the angle of rotation θ relative to some reference axis, and their widths.

In one embodiment, the arc 850 represents the edge of a circular sensing region, such as that described above in conjunction with FIG. 6. Because of the circular shape of the sensing region, some of the capacitance sensor elements 810-813 are shorter in length than others. Capacitance sensing elements with different lengths can result from sensing region shapes that are other than circular or curved.

In another embodiment, the arc 850 can represent a portion of a sensing region where the underlying material has some attribute or property that, if not compensated, causes an uneven or non-uniform effect on capacitive coupling. For example, the arc 850 can represent a portion of a sensing region where the underlying material is thicker (e.g., the arc 850 can represent the edge of a concave, bowl-shaped sensing region); toward the center of the sensing region, the underlying material is thinner. Thus, at positions along the arc 850, the distance between a sensing surface and the capacitance sensor elements is greater than it is toward the center of the sensing region.

In the first embodiment, the capacitance sensor elements 810-813 are dimensioned to compensate for their different lengths, such that the background capacitances of the various capacitance sensor elements 810-813 are approximately the same. In the second embodiment, the capacitance sensor elements 810-813 are dimensioned to compensate for the uneven effect of the material intervening between the sensor elements and the sensing surface, such that capacitive coupling is uniform.

In the first embodiment, the widths of shorter capacitance sensor elements can be increased relative to the widths of longer capacitance sensor elements, in a manner similar to that described above in conjunction with FIG. 6. The widths of certain legs of a capacitance sensor element can be increased relative to the widths of other legs of that capacitance sensor element; that is, not all of the legs in a respective capacitance sensor element have to be the same width. Alternatively, the number of turns along the length of a respective capacitance sensor element can be increased, effectively lengthening that capacitive sensor element within the confines of the sensing region.

In the second embodiment, the widths of those portions of the capacitance sensor elements underneath thicker regions of the intervening material can be increased relative to the widths of those portions of the capacitance sensor elements that are underneath thinner regions of the material. As mentioned above, the widths of certain legs of a capacitance sensor element can be increased relative to the widths of other legs of that capacitance sensor element; that is, not all of the legs in a respective capacitance sensor element have to be the same width. Alternatively, the number of turns can be increased underneath thicker regions of the material, effectively increasing the surface area of the capacitance sensor elements in the thicker regions.

In conclusion, embodiments in accordance with the present invention pertain to capacitive sensing apparatuses that can utilize non-planar sensing surfaces, but permit uniform capacitive coupling. Significantly, uniform capacitive coupling is achieved for non-planar capacitive sensing apparatuses without having to apply correction factors to the output signals of the capacitance sensor elements. Correction factors are generally less accurate; thus, embodiments in accordance with the present can be used to more accurately determine the position of an object relative to a sensing surface.

The capacitive sensing apparatuses described herein may be used to detect objects on either side of the substrate onto which they are fabricated. To prevent detection of signals of noise from one side of the substrate, a ground plane or a driven shield conductor may be utilized to shield that side or a portion of either side.

In addition, the features of the various embodiments described herein can be used alone or in combination.

In addition to determining position, or as an alternative to determining position, embodiments of the capacitive sensing apparatuses described herein can be used to detect movement, or a rate of movement, of an object or finger relative to a sensing region.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be

What is claimed is:

1. A capacitance sensing apparatus comprising:
   a layer of material; and
   a first capacitance sensor element covered by said layer of material, said first capacitance sensor element configured to sense a capacitance induced when an object is proximate to a sensing surface;
   wherein said layer of material has an uneven effect on a measure of capacitance, wherein said first capacitance sensor element is dimensioned to compensate for said effect such that said measure of capacitance is substantially the same without regard to a position of said object relative to said first capacitance sensing element.

2. The apparatus of claim 1 wherein said first capacitance sensor element has a width that varies along its length.

3. The apparatus of claim 1 wherein said layer of material has a non-uniform thickness, wherein a dimension of said first capacitance sensor element varies in correspondence with variations in said thickness.

4. The apparatus of claim 1 wherein said sensing surface has a shape that is not uniformly flat, wherein said layer of material conforms to said shape and wherein a dimension of said first capacitance sensor element varies in correspondence with said shape.

5. The apparatus of claim 1 wherein a property of said layer of material is non-uniform across said layer of material, wherein said property is selected from the group consisting of: hardness, permittivity, dielectric constant, and density; and wherein a dimension of said first capacitance sensor element varies in correspondence with variations in said property.

6. The apparatus of claim 1 wherein said layer of material comprises more than one type of material.

7. The apparatus of claim 1 wherein said material is selected from the group consisting of: a fluid, a gas, a polymer, a plastic, and a foam.

8. The apparatus of claim 1 further comprising a second capacitance sensor element configured to sense a capacitance induced when said object is proximate to said sensing surface, wherein said second capacitance sensor element is dimensioned to compensate for said effect and wherein said second capacitance sensor element is sized differently than said first capacitance sensor element.

9. The apparatus of claim 1 further comprising:
   a second capacitance sensor element; and
   a conductor disposed between said first and second capacitance sensor elements, wherein said conductor is coupled to a shield.

10. The apparatus of claim 1 further comprising a conductor adjacent to said first capacitance sensor element, wherein said conductor is coupled to a shield.

11. The apparatus of claim 10 further comprising a second capacitance sensor element within said conductor.

12. The apparatus of claim 1 operable for determining an unambiguous location of said object.

13. The apparatus of claim 1 operable for sensing motion of said object.

14. A capacitance sensing apparatus for sensing an object proximate to a capacitance sensing surface, said apparatus comprising:
   a first capacitance sensor element; and
   a second capacitance sensor element, wherein said first capacitance sensor element has a size that is different from that of said second capacitance sensor element;
   wherein dimensions of said first and second capacitance sensor elements are selected such that a first background capacitance, if measured by said first capacitance sensor element in the absence of said object, and a second background capacitance, if measured by said second capacitance sensor element in the absence of said object, are substantially equal, and such that a first capacitance measured by said first capacitance sensor element detecting said object proximate said first capacitance sensor element and a second capacitance measured by said second capacitance sensor element detecting said object proximate said second capacitance sensor element are substantially equal.

15. The apparatus of claim 14 wherein said first and second capacitance sensor elements have widths that vary with their respective lengths.

16. The apparatus of claim 14 further comprising a conductor disposed between said first and second capacitance sensor elements, wherein said conductor is coupled to a shield.

17. The apparatus of claim 14 further comprising a conductor adjacent to said first capacitance sensor element, wherein said conductor is coupled to a shield and wherein said second capacitance sensor element is disposed within said conductor.

18. A capacitance sensing apparatus comprising:
   a reference sensing surface;
   a first capacitance sensor element traversed by said sensing surface, said first capacitance sensor element configured to sense a capacitance induced when an object is proximate to said sensing surface; and
   a layer of material disposed between said sensing surface and said first capacitance sensor element, wherein an attribute of said layer of material is non-uniform across said layer of material such that said layer of material has an uneven effect on capacitance;
   wherein if said object is at a first position on said sensing surface, a first capacitance is induced, and if said object is at a second position on said sensing surface, a second capacitance is induced; and wherein said first capacitance sensor element is dimensioned to compensate for said effect such that said first and second capacitances are substantially equal.

19. The apparatus of claim 18 wherein said first capacitance sensor element has a width that varies with length.

20. The apparatus of claim 18 wherein said layer of material has a non-uniform thickness, wherein a dimension of said first capacitance sensor element varies in correspondence with variations in said thickness.

21. The apparatus of claim 18 wherein said sensing surface has a shape that is not uniformly flat, wherein said layer of material conforms to said shape and wherein a dimension of said first capacitance sensor element varies in correspondence with said shape.

22. The apparatus of claim 18 wherein said attribute comprises a property selected from the group consisting of: hardness, permittivity, dielectric constant, and density; and wherein a dimension of said first capacitance sensor element varies in correspondence with variations in said property.

23. The apparatus of claim 18 wherein said layer of material comprises more than one type of material.

24. The apparatus of claim 18 wherein said material is selected from the group consisting of: a fluid, a gas, a polymer, a plastic, and a foam.

25. The apparatus of claim 18 further comprising a second capacitance sensor element configured to sense a capacitance induced when said object is proximate to said sensing surface, wherein said second capacitance sensor element is dimensioned to compensate for said effect and wherein said second capacitance sensor element is sized differently than said first capacitance sensor element.

26. The apparatus of claim 18 further comprising:
a second capacitance sensor element; and
a conductor disposed between said first and second capacitance sensor elements, wherein said conductor is coupled to a shield.

27. The apparatus of claim 18 further comprising a conductor adjacent to said first capacitance sensor element, wherein said conductor is coupled to a shield.

28. The apparatus of claim 27 further comprising a second capacitance sensor element within said conductor.

29. The apparatus of claim 18 operable for determining an unambiguous location of said object.

30. The apparatus of claim 18 operable for sensing motion of said object.

* * * * *